United States Patent
Badur et al.

(10) Patent No.: US 8,640,376 B2
(45) Date of Patent: Feb. 4, 2014

(54) FISHING SYSTEM FOR THE PHYSICALLY CHALLENGED

(75) Inventors: Daniel A. Badur, South Bend, IN (US); Kenneth Stelmaszek, Walkerton, IN (US); James L. Meckley, Argos, IN (US)

(73) Assignee: Fishing Abilities, Inc., South Bend, IL (US)

( * ) Notice: Subject to any disclaimer, the term of this patent is extended or adjusted under 35 U.S.C. 154(b) by 191 days.

(21) Appl. No.: 13/101,682

(22) Filed: May 5, 2011

(65) Prior Publication Data

US 2012/0280074 A1 Nov. 8, 2012

(51) Int. Cl.
*A01K 89/012* (2006.01)
*A01K 89/017* (2006.01)

(52) U.S. Cl.
USPC ............................... 43/21; 242/225; 242/250

(58) Field of Classification Search
USPC ............... 43/21, 20, 21.2; 242/225–226, 249, 242/250, 251, 253, 254, 264, 267, 268
See application file for complete search history.

(56) References Cited

U.S. PATENT DOCUMENTS

| | | | | |
|---|---|---|---|---|
| 2,714,271 A | * | 8/1955 | Stratton | 43/21 |
| 2,743,067 A | * | 4/1956 | Stratton | 242/257 |
| 3,030,046 A | * | 4/1962 | Markoff-Moghadam | 242/250 |
| 3,049,829 A | * | 8/1962 | Clapp | 43/6.5 |
| 3,216,145 A | * | 11/1965 | Aunspaugh | 43/21.2 |
| 3,220,667 A | * | 11/1965 | Madsen | 242/250 |
| 3,968,954 A | * | 7/1976 | Casco et al. | 254/332 |
| 4,344,587 A | * | 8/1982 | Hildreth | 242/390.9 |
| 4,515,324 A | * | 5/1985 | Barton | 242/250 |
| 5,772,140 A | * | 6/1998 | Murayama | 242/279 |
| 6,896,216 B2 | * | 5/2005 | Chiba | 242/250 |
| 7,398,939 B2 | * | 7/2008 | Terauchi et al. | 242/250 |

OTHER PUBLICATIONS

"A-dec Zebco 6V electric reel—John's Reel II—NIB", eBay, [retrieved from the Internet on Apr. 12, 2012 using <URL: http://www.ebay.com/itm/A-dec- Zebco-6V- electric-reel- Johns- Reel-II-NIB-/ 160768849701pt= LH_DefaultDomain_0& hash= item256e91f725>].

* cited by examiner

*Primary Examiner* — Darren W Ark
*Assistant Examiner* — Kathleen Alker
(74) *Attorney, Agent, or Firm* — Sutton McAughan Deaver PLLC

(57) ABSTRACT

An improved fishing system for the physically challenged including a reel assembly, the reel assembly including a reel shaft extension extending from a reel housing; a first toothed pulley coupled to the reel shaft extension; an electric motor assembly including an electric motor with a shaft extending from the electric motor; a second toothed pulley coupled to the motor shaft; and a toothed belt coupled to the first and the second toothed pulleys.

17 Claims, 9 Drawing Sheets

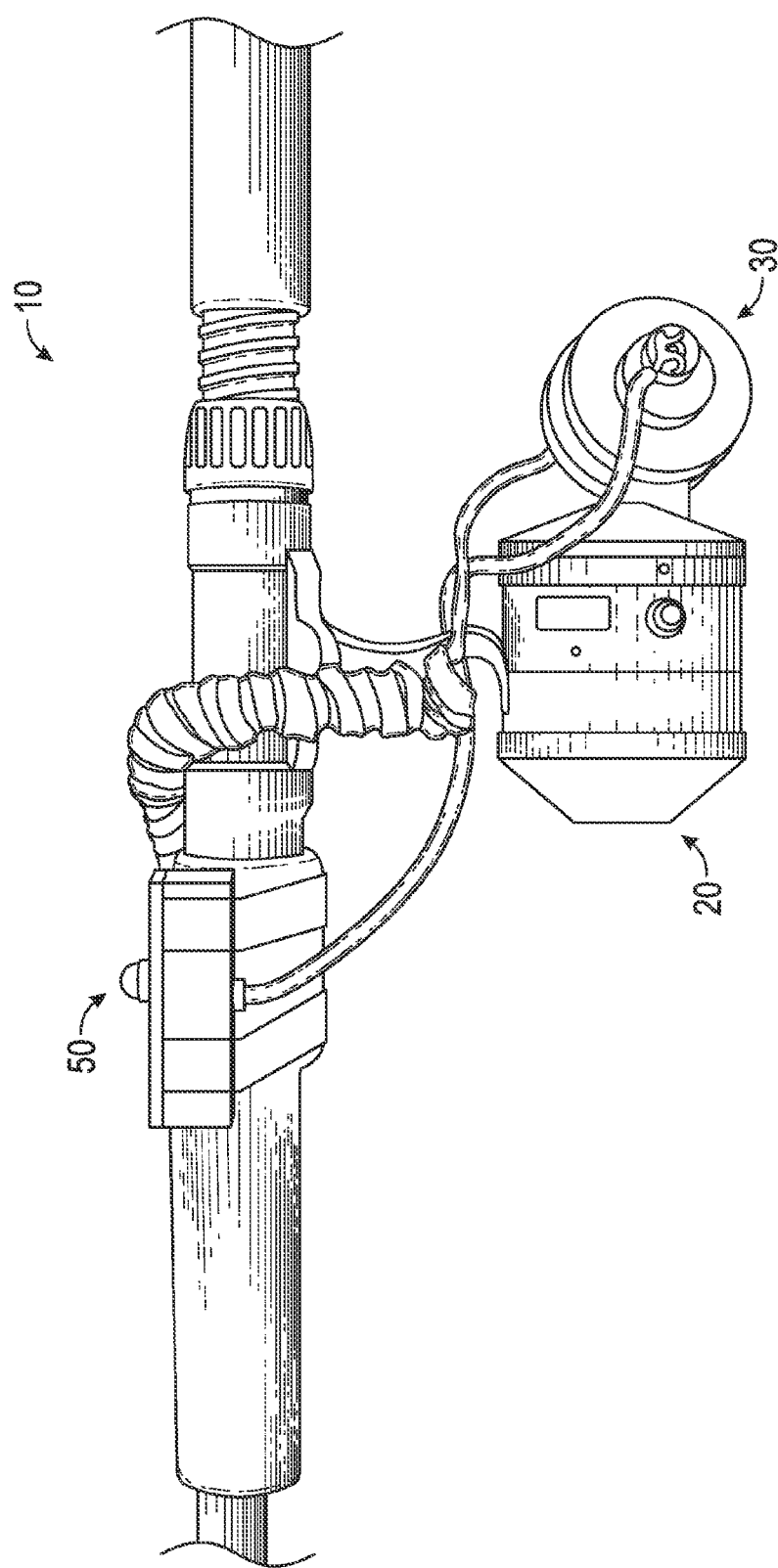

FISHING SYSTEM FOR THE PHYSICALLY CHALLENGED

CROSS REFERENCE TO RELATED APPLICATIONS

Not applicable.

STATEMENT REGARDING FEDERALLY SPONSORED RESEARCH

Not applicable.

REFERENCE TO APPENDIX

Not applicable.

BACKGROUND OF THE INVENTION

1. Field of the Invention

This disclosure relates generally to a fishing system for the physically challenged.

2. Description of the Related Art

Individuals with physical limitations or challenges (e.g., full or partial paralysis) interested in engaging in fishing activities are often met with several obstacles. Often appropriate fishing equipment is not available. When one locates potentially suitable fishing equipment, it is often complicated and thus expensive and prone to breakage. To overcome these obstacles, a widely available, robust, reasonably priced fishing system suitable for use by the physically challenged is desired.

SUMMARY OF THE INVENTION

In general, in one aspect, the disclosed embodiments include an improved fishing system for the physically challenged comprising: a reel assembly, the reel assembly comprising: a rod mount for mounting the reel assembly to a rod; a reel element for casting and retrieving fishing line, the reel element including a reel housing and an interior shaft extending through the reel housing; a reel shaft extension extending from the reel housing; and a first toothed pulley coupled to the reel shaft extension; an electric motor assembly, the electric motor assembly comprising: an electric motor; a motor shaft extending from the electric motor; a second toothed pulley coupled to the motor shaft; two mounting collars coupled to the electric motor, the mounting collars being formed from metal; and a mounting block, the mounting block being formed from a non-metallic material; wherein the electric motor is affixed to the reel assembly such that the mounting block is positioned between the mounting collars and the reel assembly; a coupling assembly, the coupling assembly comprising: a toothed belt coupled to the first and the second toothed pulleys; and a tensioning arm coupled to the reel shaft extension and to the motor shaft to provide tensioning of the toothed belt; and an actuator assembly, the actuator assembly comprising: leads coupled to the electric motor; power supply leads adapted for coupling to a source of electric power; and an actuator coupled to the leads coupled to the electric motor and the power supply leads for selectively coupling the electric motor to the source of electric power.

In a second aspect, the disclosed embodiments comprise a fishing system comprising: a reel assembly, the real assembly including a real reel housing; a non-metallic mounting block coupled to the rear reel housing; a pair of metallic mounting collars coupled to the mounting block; an electric motor held within the mounting collars, such that there is an air path on either side and between the mounting collars for air to flow about and around the electric motor; and an actuator assembly coupled to the electric motor and adapted to be coupled to a source of electric power for selectively coupling the electric motor to the source of electric power.

In yet another aspect, the disclosed embodiments comprise a improved fishing system for the physically challenged comprising: a reel assembly, the reel assembly comprising: an interior shaft; first and second bearing elements coupled to the interior shaft; a reel shaft extension coupled to the interior shaft and extending from a first side of the reel housing; a first toothed pulley coupled to the reel shaft extension; a locknut assembly extending into a second side of the reel housing, the locknut assembly being coupled to the interior shaft and adapted to be adjusted to adjust the tensioning of the interior shaft; an electric motor assembly, the electric motor assembly comprising: an electric motor; a motor shaft extending from the electric motor; a second toothed pulley coupled to the motor shaft; mounting collars and a mounting block affixing the electric motor to the reel assembly; a coupling assembly, the coupling assembly comprising: a toothed belt coupled to the first and the second toothed pulleys; and a tensioning arm coupled to the reel shaft extension and to the motor shaft to provide tensioning of the toothed belt; and an actuator assembly for selectively coupling the electric motor to the source of electric power.

BRIEF DESCRIPTION OF THE DRAWINGS

The foregoing and other advantages of the disclosed embodiments will become apparent from the following detailed description and upon reference to the drawings, wherein:

FIGS. 1A and 1B illustrate an exemplary improved fishing system suitable for use by physically challenged individuals.

DETAILED DESCRIPTION

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

Figure 1B:
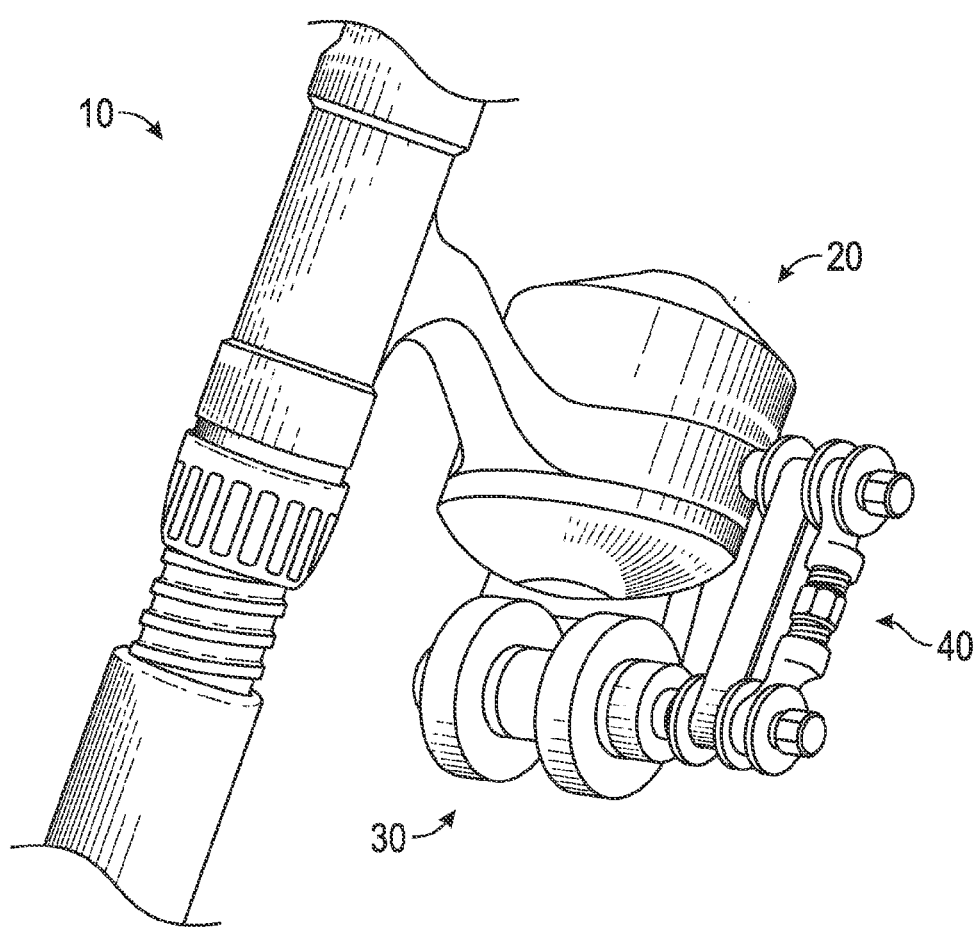

Exemplary Fishing System:

Turning to the drawings and, in particular, to FIGS. 1A and 1B, an improved fishing system 10 is illustrated. The fishing system 10 includes a reel assembly 20 that is mounted via conventional reel mount to a rod (not labeled); an electrical motor assembly 30 mounted to the rear portion of the reel assembly 20; a coupling assembly 40 that couples the output of the electric motor assembly 30 to the input of the reel assembly 10; and an actuator assembly 50 for actuating the electric motor assembly. As reflected in the figure, the electric motor assembly 30 is positioned with respect to the reel assembly 20 such that the electric motor assembly is located at the end of the reel assembly that is opposite the tip of the rod (not illustrated) to which the reel assembly is mounted and the actuator assembly 50 is located at a position between the rod tip and the reel assembly 20. This positioning tends to prohibit contact between a person's arm used to actuate the actuator assembly 50 and the electric motor assembly 30.

As reflected in FIGS. 1A and 1B, the actuator assembly 50 and the coupling assembly 40 are positioned such that the actuator assembly 50 extends from the reel assembly in a direction substantially opposite the direction from which the coupling assembly 40 extends. In other words, looking down at the fishing assembly 10 from the general view of FIG. 1B, the actuator assembly 50 extends out to one side (the left side in the example), with the coupling assembly 40 extending out to the other side (the right side in the example).

Figure 2B:
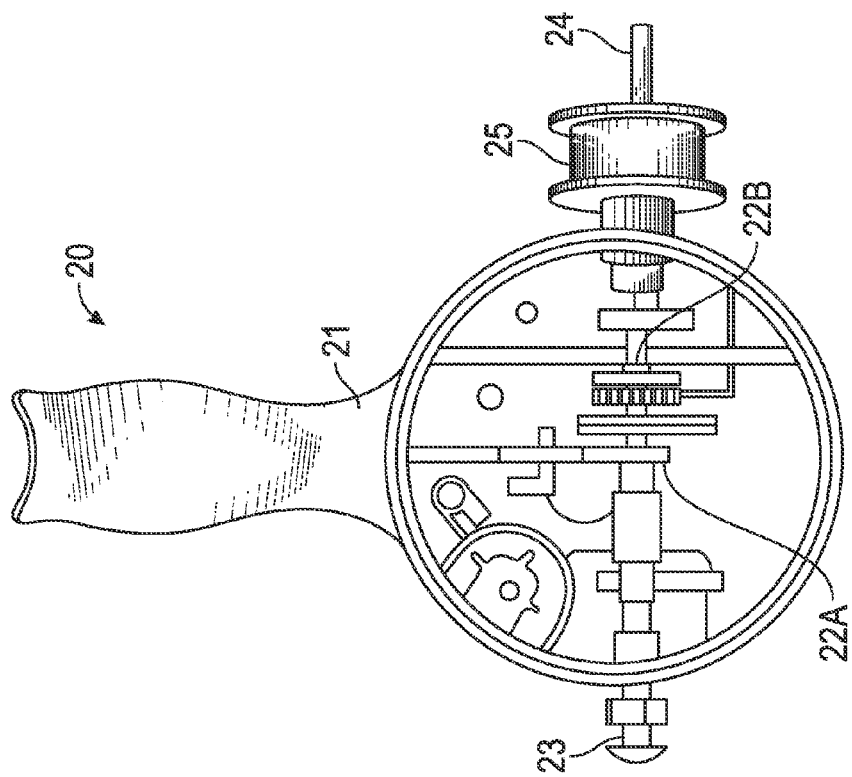
FIGS. 2A-2C illustrate an exemplary reel assembly for use in the fishing system of FIGS. 1A and 1B.
Figure 2A:
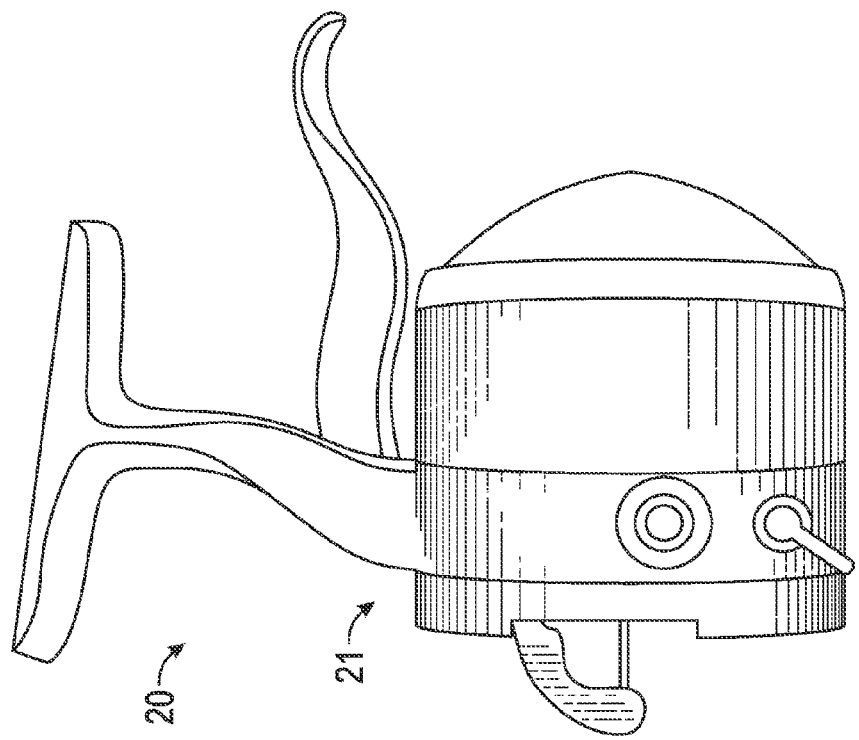
Figure 2C:
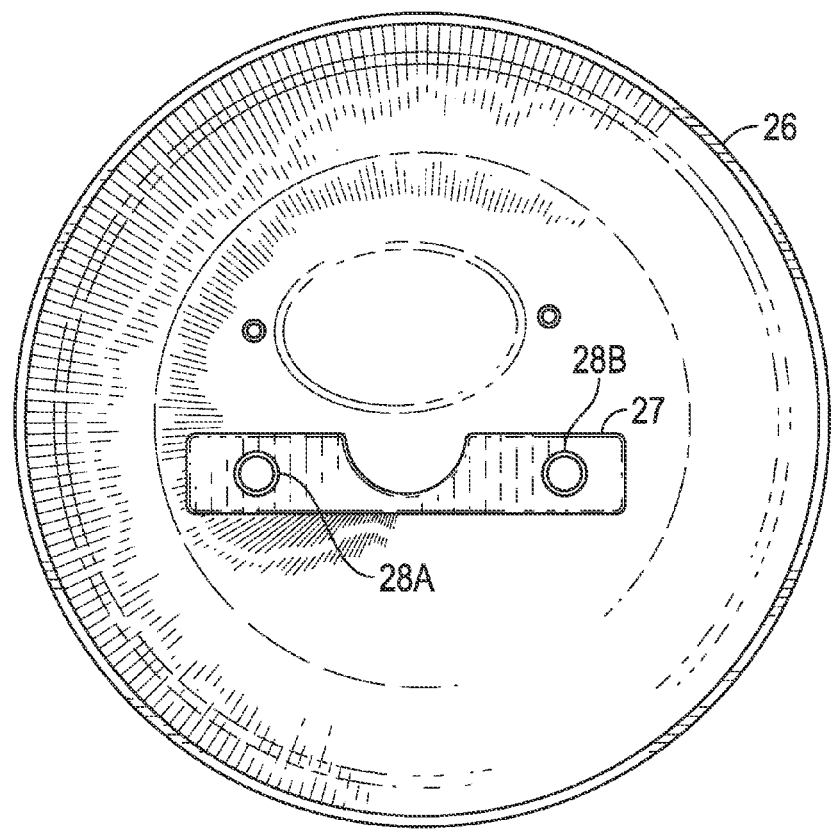

FIGS. 2A-2C illustrate an exemplary embodiment of the reel assembly 20.

Referring to FIGS. 2A and 2B, portions of an exemplary reel assembly 20 are illustrated. The illustrated reel assembly 20 of FIGS. 2A and 2B reflects portions of the reel assembly without a back cover to which the electric motor assembly 30 is mounted. The back cover of the reel assembly can be seen in FIGS. 1A and 1B.

As reflected in FIGS. 2A and 2B, the reel assembly 20 includes a rod mount 21 for mounting the reel assembly to a rod. A casting lever (not labeled) extends from the rod mount 21 and can be activated to enable casting of line spooled around the reel assembly in a manner known in the art.

A shaft element (not separately labeled) extends through the reel assembly. Support ball bearing assemblies 22A and 22B are positioned around the shaft element near a gear element of the reel assembly to provide additional support. The ends of the shaft element are drilled or tapped and threaded to receive, on one end, a locknut assembly 23 and, on the other end, an extending shaft 24. A toothed pulley 25 is fixed on the shaft 24 and a portion of the shaft extends out from the toothed pulley. In use, the locknut assembly may be adjusted through tightening or loosening the locknut so as to increase or decrease the tensioning placed on the shaft assembly.

In one embodiment, the reel assembly 20 is formed by modifying a commercially available reel assembly, such as a ZEBCO® 33® Triggerspin™ spincasting reel (ZEBCO®, 33®, and Triggerspin™ are trademarks of Zebco Brands, a W.C. Bradley Co.). The modifications may include: (i) adding additional supporting bearing structures 22A/22B, (ii) drilling an interior threaded bore and screwing in a shaft such as shaft 24 to one end of the interior shaft (or otherwise affixing shaft 24 to the interior shaft); and (iii) inserting a bushing and locknut to form the locknut assembly 23 to the other end of the interior shaft.

In operation, rotation of the shaft element 25 (e.g., by application of a force to toothed pulley 25) will result in retrieval of a cast fishing line.

FIG. 2C illustrates the rear reel housing or back cover 26. It is designed to fit onto the rear of the housing depicted in FIGS. 2A and 2B in a conventional manner. Also illustrated in FIG. 2C is mounting bracket 27 and portions of mounting screws 28A and 28B. As discussed below, the mounting bracket 27 and mounting screws 28A and 28B are used to couple the electric motor assembly 30 to the reel assembly 20.

Figure 3A:
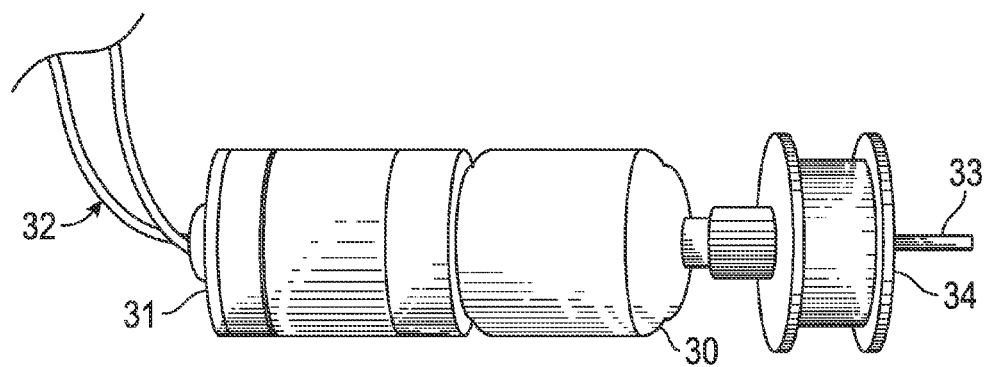
FIGS. 3A-3D illustrate an exemplary electric motor assembly for use in the fishing system of FIGS. 1A and 1B.
Figure 3B:
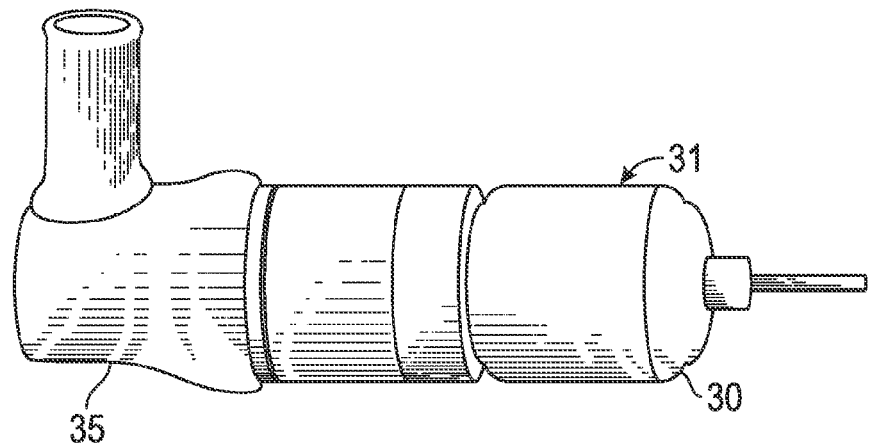

FIGS. 3A and 3B illustrate the electric motor assembly 30 in greater detail. Referring to the figures, the electric motor assembly 30 comprises an electric motor 31. The electric motor may be any suitable motor but is preferable one that has a length in its longest dimension that is not substantially greater than (i.e., not more than 10% greater than), and is preferably less than, the width of the reel assembly 20. Having a motor of such length helps control the overall size of the fishing assembly 10, thus improving its ease of use.

The electric motor 31 is coupled at one end to electrical leads 32 that are adapted to supply power to the electric motor 31. The leads 32 may take the form of wires enclosed or wrapped in a protective cover.

A shaft 33 extends from the end of the electric motor 31 that is not coupled to the electrical leads 32. A toothed pulley 34 is mounted on the shaft 33 and a portion of the shaft 33 extends out from the toothed pulley 34.

In the illustrated embodiment, the toothed pulley 34 coupled to the electric motor shaft 33 is the same size, and has the same number of teeth, as the toothed pulley 25 coupled to the shaft extending from the reel assembly 20. Alternate embodiments are envisioned wherein the pulleys are of different sizes so as to enable a gearing connection between the two pulleys 25 and 34.

In certain embodiments (e.g., saltwater fishing assemblies) it may be desirable to cover the connection between the leads 32 and the electric motor 31. In such embodiments, the leads 32 may be passed through a protective cap, such as cap 35, and then connected to the electric motor by soldering or other suitable connection process. The cap 35 may then be affixed to the electric motor 31 by, for example epoxy, and the other end of the cap 35 may be plugged with epoxy or another suitable plug material to help seal the cap 35 and protect the connection between the leads 32 and the motor 31.

Figure 3C:
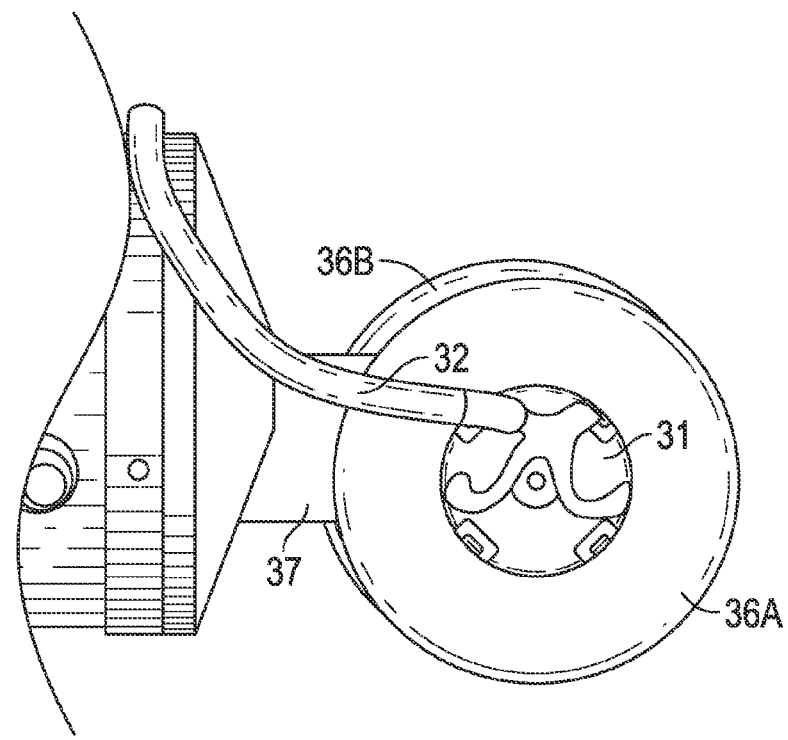
Figure 3D:
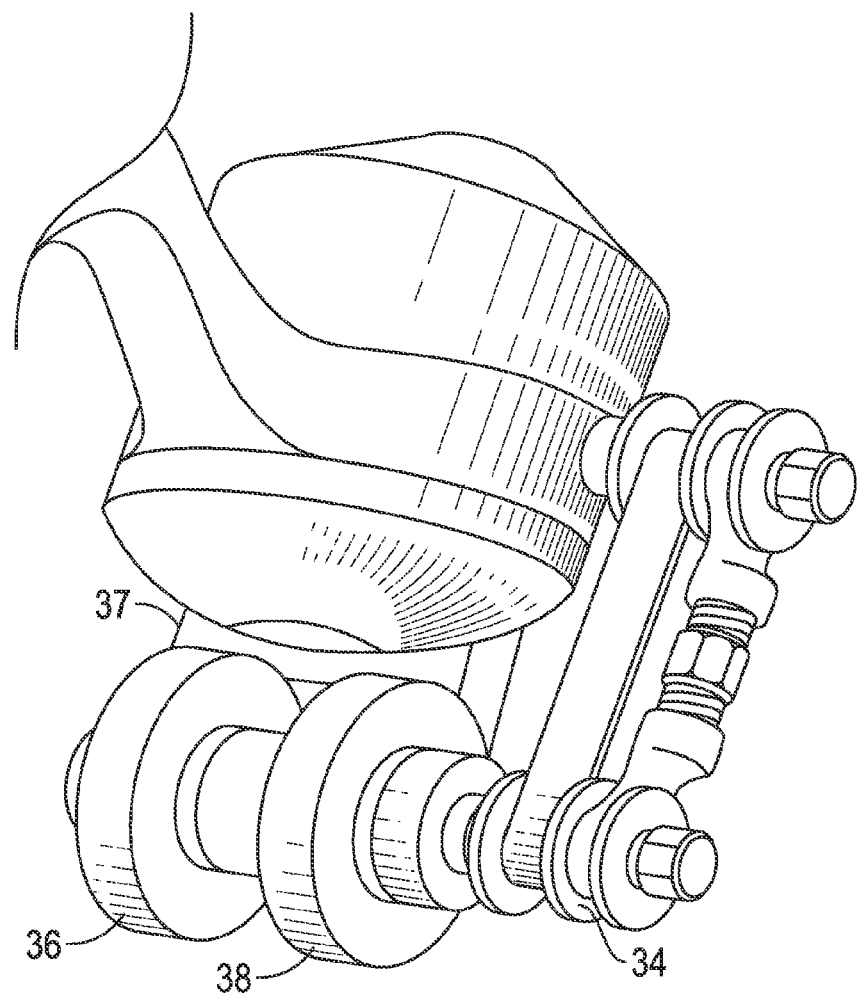

FIGS. 3C and 3D illustrate the manner in which the motor is coupled to the reel assembly 20. As illustrated, two mounting collars 36 and 38 are coupled around the electric motor 31 at locations near the ends of the motor 31. FIG. 3C shows an exemplary construction for mounting collar 36. The same construction may be used for collar 38. As illustrated, the mounting collar 36 may be formed from two substantially "C" shaped collar sections 36A and 36B that are coupled to one another about the motor 31. In the illustrated example, each C-shaped collar section 36A and 36B is a section of machined aluminum and the two C-shaped sections are held together via screws (not illustrated).

A non-metallic mounting block or element 37 is positioned between the mounting collars 36 and 38 and the rear end of the reel assembly 20. In one embodiment, the mounting element 37 is affixed to the mounting collars 36 and 38 via screws (like screws 28A and 28B) that pass from the interior of the reel assembly 20, through the mounting bracket in the reel assembly 27, and through the rear of the reel assembly 26 and into the mounting collars 36 and 38. Alternately, screws 28A and 28B or other coupling structures may be passed through the mounting collars 36 and 38, through the mounting block 37, through the rear housing 26 of the reel assembly and into the reel mounting bracket 27. The block may be formed from plastic and, in one embodiment, from polypropylene.

As may be noted, the collars 36 and 38 and the mounting element 37 are such that when the electric motor is held within the mounting collars, there is an air path on either side and between the mounting collars for air to flow about and around the electric motor.

The use of metallic mounting collars 36 and 38 enables the mounting collars to act as both a mounting mechanism and a heat sink to dissipate heat generated by the electric motor 31. This helps keep the motor 31 cool to the touch and further improves the efficiency and operating life of the motor 31. The use of a non-metallic mounting block 37 between the collars 36/38 and the rear of the reel assembly helps prevent the transference of heat generated by the motor 31 to the reel assembly 20, thus increasing the operating life of the reel assembly and avoiding degradation of the fishing line within the reel assembly.

The electric motor may be any suitable motor, such as a Hennkwell 12 volt DC Gear Motor PK2262150-104.

Figure 4A:
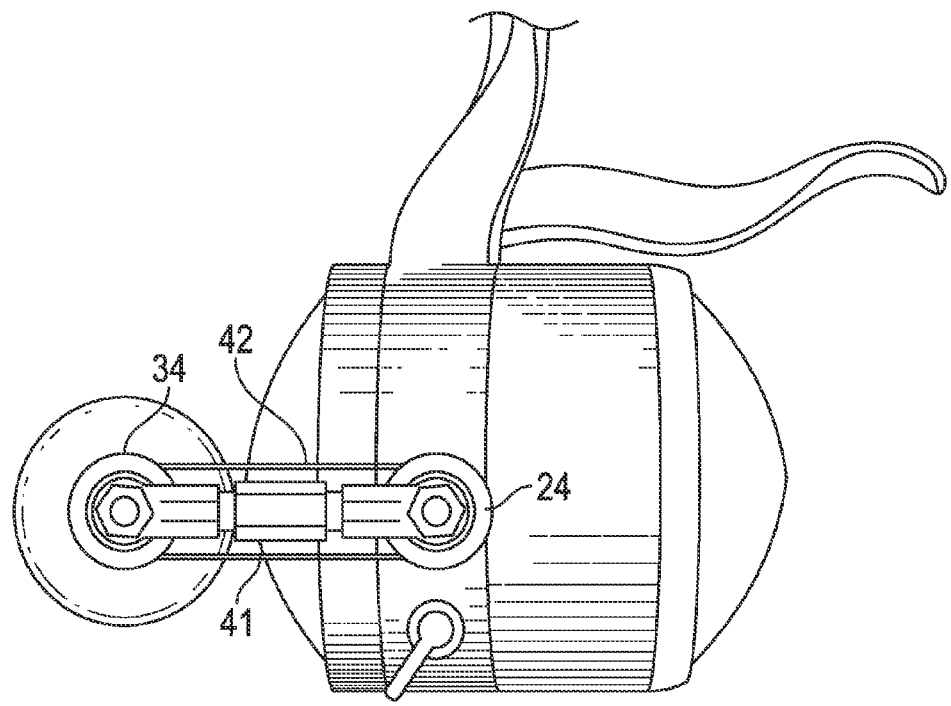
FIGS. 4A and 4B illustrate an exemplary coupling assembly for use in the fishing system of FIGS. 1A and 1B.
Figure 4B:
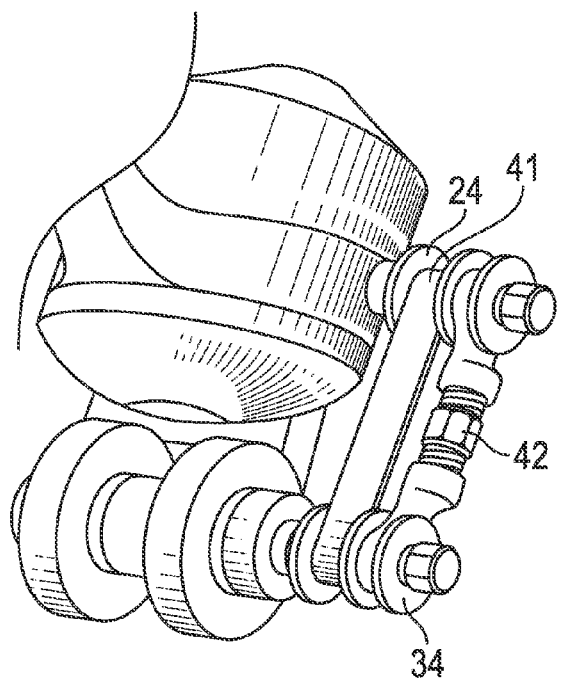

The toothed pulley 34 coupled to the shaft extending from the electric motor 31 is coupled to the toothed pulley 25 extending from the shaft coupled to the reel assembly 20 via a coupling assembly 40, shown in more detail in FIGS. 4A and 4B. In general, the coupling assembly 40 includes a toothed belt element 41 and a tensioning arm 42 coupled to the portions of the shafts 24 and 33 that extend out from their respective toothed pulleys. The belt element 41 is coupled such that rotation of the electric motor 31 will drive the toothed pulled 34, which will cause the belt to rotate such that the toothed pulley 25 rotates and reels in any cast fishing line extending from the reel assembly 20. The use of toothed pulleys 25 and 34 and the toothed belt 41 helps ensure proper transfer of power from the motor 31 to the reel assembly 20.

The tensioning arm 42 comprises an arm element that may be extended or retracted through rotation of an interior arm. The tension arm 42 is coupled to the shafts 24 and 33 by locknuts (not separately labeled). During construction (and during maintenance of the reel assembly 20) the locknut assembly 23 within the reel assembly 20 may be loosened, the belt 41 placed about the pulleys 25 and 34, and the tension arm 42 may be adjusted to properly tension the belt 41 between the pulleys 25 and 34. Then the locknut assembly 23 may be tightened to properly tension the shaft element within the reel assembly to enable proper retrieval of fishing line.

Figure 5A:
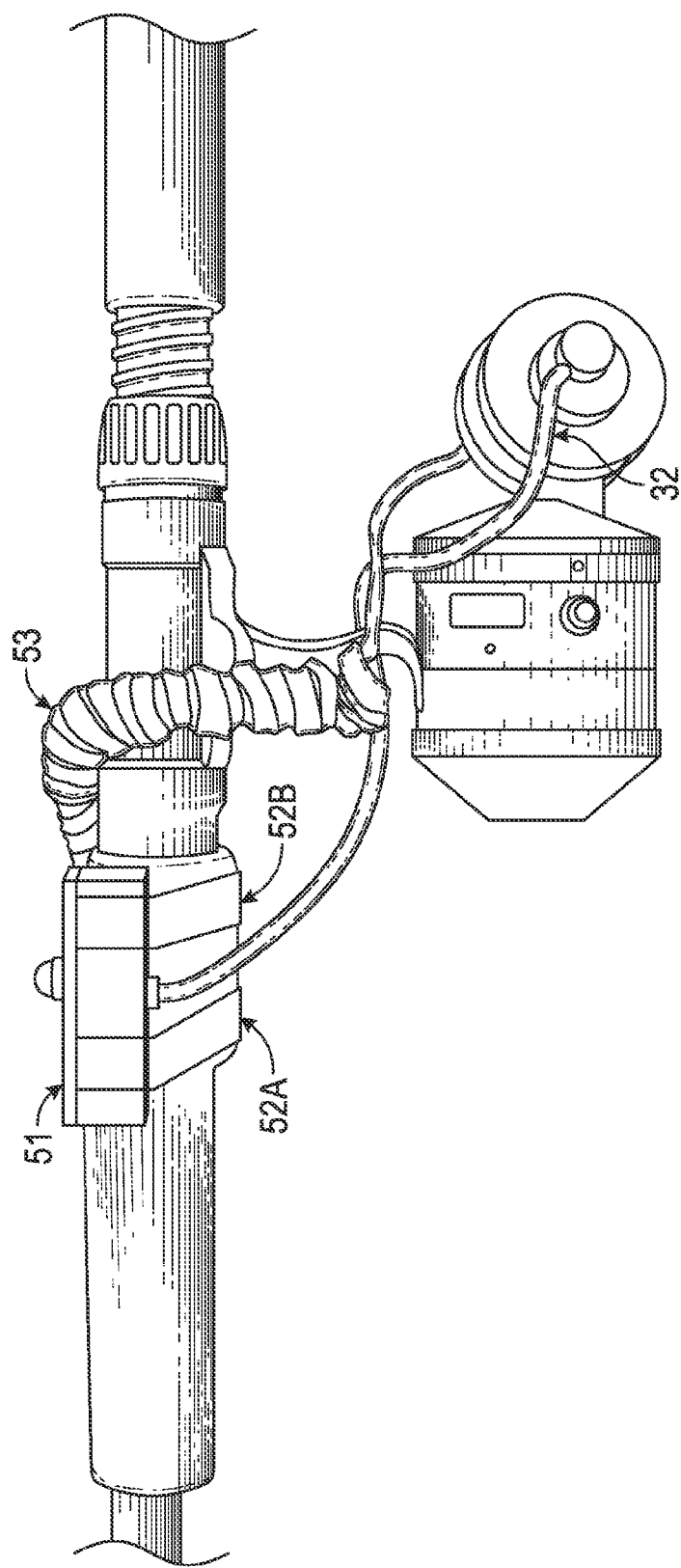
FIGS. 5A and 5B illustrate an exemplary actuator assembly for use in the fishing system of FIGS. 1A and 1B.
Figure 5B:
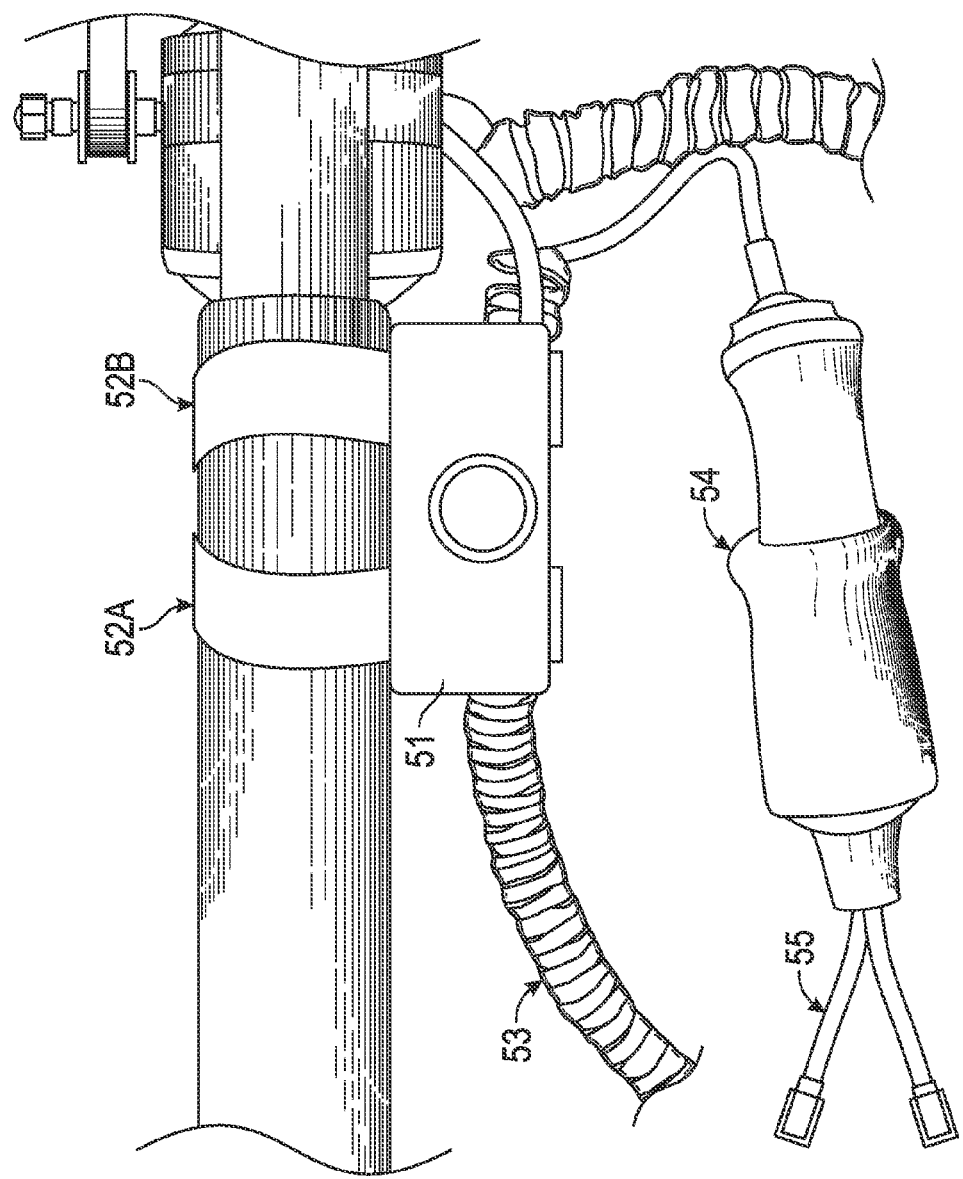

The electrical leads 32 from the electric motor 31 are coupled to an actuator assembly 50 illustrated in greater detail in FIGS. 5A and 5B. Referring to FIGS. 5A and 5B, the actuator assembly 50 includes an actuator box 51. Positioned in or on the actuator box is an actuating element (not separately labeled) such as a button. The actuating element may be a simple button or switch that, at one end, is coupled to the leads 32 from the electric motor 31 and, at the other end, to power supply leads 53 coupled to a source of electric power (such as a 12 Volt battery). In this embodiment, actuation of the button will create a conductive path from the battery to the motor 31, thus activating the motor. The foregoing embodiments help minimize the amount of physical effort and coordination required to use the fishing system, thus making it possible, or at least easier, for physically challenged individuals to enjoy fishing activities.

Alternate embodiments are envisioned where the actuator box 51 will include a variable resistive element that not only will serve to couple the electric motor 31 to the source of power, but will also serve to regulate the amount of power to the electric motor 31, for example, to allow for variable speed retrieval.

In some embodiments, four slits are provided in the actuator box 51. The slits are sized to receive connecting bands 52A and 52B for coupling the actuator box to, for example, a rod. In one embodiment the bands 52A and 52B are Velcro traps. Alternate embodiments are envisioned where the connecting bands 52A and 52B are used to couple the actuator box 51 at an alternate location such as, for example, to a wheelchair.

In the illustrated embodiment, the power supply leads are not coupled directly to a power source, but are instead coupled to an intermediate fusing element 54 which, in turn, is coupled to connectors suitable for coupling to a battery 55.

The above embodiments are illustrative and not limiting. Other and further embodiments utilizing one or more aspects of the inventions described above can be devised without departing from the spirit of Applicants' invention.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements.

What is claimed is:

1. A fishing system comprising:
    a reel assembly, the reel assembly including a rear reel housing;
    a reel shaft within the reel assembly, a first pulley coupled to the reel shaft; a motor shaft extending from the electric motor and a second pulley coupled to the motor shaft; and a belt coupling the first pulley to the second pulley;
    a non-metallic mounting block coupled to the rear reel housing;
    a pair of metallic mounting collars coupled to the mounting block;
    an electric motor held within the mounting collars, such that there is an air path on either side and between the mounting collars for air to flow about and around the electric motor;
    a tensioning arm engaging the reel shaft and the motor shaft and adapted to tension the belt: and
    an actuator assembly coupled to the electric motor and adapted to be coupled to a source of electric power for selectively coupling the electric motor to the source of electric power.

2. The fishing system of claim 1 wherein each of the mounting collars is formed from two C-shaped sections.

3. The fishing system of claim 1 wherein the mounting collars are formed from machined aluminum.

4. The fishing system of claim 1 wherein the actuator assembly includes a button for selectively coupling the motor to the source of electric power.

5. The fishing system of claim 1 wherein the first and second pulleys are toothed pulleys and the belt is a toothed belt.

6. An improved fishing system for the physically challenged comprising:
  (a) a reel assembly, the reel assembly comprising:
    (1) a rod mount for mounting the reel assembly to a rod;
    (2) a reel element for casting and retrieving fishing line, the reel element including a rear reel housing and an interior shaft extending through the reel housing;
    (3) a reel shaft extension extending from the rear reel housing; and
    (4) a first toothed pulley coupled to the reel shaft extension;
  (b) an electric motor assembly, the electric motor assembly comprising:
    (1) an electric motor;
    (2) a motor shaft extending from the electric motor;
    (3) a second toothed pulley coupled to the motor shaft;
    (4) two mounting collars coupled to the electric motor, the mounting collars being formed from metal; and
    (5) a mounting block, the mounting block being formed from a non-metallic material, wherein the electric motor is affixed to the reel assembly such that the mounting block is positioned between the mounting collars and the reel assembly and such that there is an air path on either side and between the mounting collars for air to flow about and around the electric motor:
  (c) a coupling assembly, the coupling assembly comprising:
    (1) a toothed belt coupled to the first and the second toothed pulleys; and
    (2) a tensioning arm coupled to and engaging the reel shaft extension and coupled to and engaging the motor shaft the tensioning arm being adapted to tension the toothed belt; and
  (d) an actuator assembly, the actuator assembly comprising:
    (1) leads coupled to the electric motor;
    (2) power supply leads adapted for coupling to a source of electric power; and
    (3) an actuator coupled to the leads coupled to the electric motor and the power supply leads for selectively coupling the electric motor to a source of electric power.

7. The improved fishing system of claim 6 wherein the first and the second toothed pulleys are of the same size.

8. The improved fishing system of claim 6 wherein the two mounting collars are formed of machined aluminum.

9. The improved fishing system of claim 6 wherein the mounting block is formed from polypropylene.

10. The improved fishing system of claim 6 further comprising a fuse element coupled to the actuator.

11. The improved fishing system of claim 6 wherein the length of the electric motor is less than the width of the reel housing.

12. The improved fishing system of claim 6 further including a protective cap coupled to the electric motor, the protective cap covering the connection between the leads coupled to the electric motor and the electric motor.

13. An improved fishing system of claim for the physically challenged comprising:
  a reel assembly, the reel assembly comprising:
    a rear reel housing;
    an interior shaft;
      first and second bearing elements coupled to the interior shaft;
    a reel shaft extension coupled to the interior shaft and extending from a first side of the reel housing;
    a first toothed pulley coupled to the reel shaft extension; and
    a locknut assembly extending into a second side of the reel housing, the locknut assembly being coupled to the interior shaft and adapted to be adjusted to adjust the tensioning of the interior shaft;
  an electric motor assembly, the electric motor assembly comprising:
    an electric motor;
    a motor shaft extending from the electric motor;
    a second toothed pulley coupled to the motor shaft;
    metallic mounting collars and a non-metallic mounting block affixing the electric motor to the rear reel assembly such that there is an air path on either side and between the mounting collars for air to flow about and around the electric motor;
  a coupling assembly, the coupling assembly comprising:
    a toothed belt coupled to the first and the second toothed pulleys such that the first pulley is coupled to the second pulley;
    a tensioning arm coupled to and engaging the reel shaft extension and coupled to and engaging the motor shaft to provide tensioning of the toothed belt; and
  an actuator assembly for selectively coupling the electric motor to a source of electric power.

14. The improved fishing system of claim 13 wherein the length of the electric motor is less than the width of the reel housing.

15. The improved fishing system of claim 13 wherein the mounting collars are formed of machined aluminum.

16. The improved fishing system of claim 15 wherein the mounting block is formed from plastic.

17. The improved fishing system of claim 16 wherein the electric motor is held within the mounting collars, such that there is an air path on either side and between the mounting collars for air to flow about and around the electric motors.

* * * * *